NEEDHAM COX, OF SALEM, ILLINOIS, ASSIGNOR TO HIMSELF, CHRISTOPHER M. HOUTS, AND J. S. MOORE, OF SAME PLACE.

Letters Patent No. 84,734, dated December 8, 1868.

IMPROVED TANNING-COMPOSITION.

The Schedule referred to in these Letters Patent and making part of the same.

*To all whom it may concern:*

Be it known that I, NEEDHAM COX, of Salem, in the county of Marion, and State of Illinois, have made certain new and useful Improvements in Tanning-Compound for tanning hides; and I do hereby declare that the following is a full and clear description thereof.

This invention has for its object the production of a tanning-compound that will both cheapen and expedite the tanning-process, and at the same time produce a superior article of leather.

To enable those skilled in the art to make and use my improved compound, I will proceed to describe its fabrication and application.

The ingredients herein employed I will designate by the numerals 1, 2, 3, 4, 5, and 6, and the proportions of each of the ingredients will be as follows:

No. 1 represents three-quarters (¾) of a bushel of "tan-bark;" No. 2 represents one-quarter (¼) of a pound of "common salt;" No. 3 represents one-half (½) ounce of "sulphuric acid;" No. 4 represents one-quarter (¼) of a bushel of "salix-root;" No. 5 represents one (1) pound of "terra-japonica;" and No. 6 represents one and one-half (1½) ounce of "common soap."

It is well known that tannin-liquid is now produced either by the use of common tan-bark or by the use of terra-japonica, and each of these ingredients of the tannin-liquid is made the basis of a separate and distinct process.

Into either of these bases, I introduce the ingredient No. 4, or salix-root, with the most valuable results, as it both expedites the process, and thereby also cheapens it, and improves the quality of the manufactured leather.

By combining the ingredients Nos. 2, 3, and 4 with either No. 1 or No. 5, the properties of the tannin, either from the tan-bark or terra-japonica, is immediately and fully developed, and one-half the quantity of the prime ingredients usually suffices for the purpose.

If Nos. 2, 3, 4, and 5 be used, No. 6 may be added with advantage, but is not absolutely required.

Leather tanned by the above process is found to be more compact and firm than that which is produced by the ordinary method of tanning.

Of course the exact proportions of the ingredients named may be varied somewhat, but these proportions are, in the main, best adapted to the purpose herein specified.

I do in nowise claim the use of the said ingredients separately, or in combinations of any two thereof; but What I do claim, is—

The use of all of said ingredients, when applied in the proportions heretofore given, or their equivalents, substantially as and for the purposes set forth.

NEEDHAM COX.

Witnesses:
THOMAS A. BARR,
M. W. HAIN.